(12) United States Patent
Bagley

(10) Patent No.: US 9,271,606 B1
(45) Date of Patent: Mar. 1, 2016

(54) RETROFITTABLE GRILL FAN ASSEMBLY

(71) Applicant: Phil A. Bagley, Walla Walla, WA (US)

(72) Inventor: Phil A. Bagley, Walla Walla, WA (US)

( * ) Notice: Subject to any disclaimer, the term of this patent is extended or adjusted under 35 U.S.C. 154(b) by 412 days.

(21) Appl. No.: 13/755,022

(22) Filed: Jan. 31, 2013

(51) Int. Cl.
*A47J 37/07* (2006.01)

(52) U.S. Cl.
CPC .................. *A47J 37/0754* (2013.01)

(58) Field of Classification Search
CPC . A47J 37/0754; A47J 37/0786; A47J 37/079; F23N 1/02; F24B 15/005; F24F 9/00; F04D 25/0673
USPC ................. 126/15 A, 25 B, 25 R, 29
See application file for complete search history.

(56) References Cited

U.S. PATENT DOCUMENTS

| | | | |
|---|---|---|---|
| 2,005,581 A * | 6/1935 | Gary et al. ................. | 15/250.01 |
| 2,850,228 A * | 9/1958 | Rowley ........................ | 417/411 |
| 2,950,669 A * | 8/1960 | Terry .......................... | 99/421 H |
| 3,099,386 A * | 7/1963 | Pieper ........................ | 417/236 |
| 3,347,220 A * | 10/1967 | Barbera, Sr. ................ | 126/25 B |
| 3,362,469 A * | 1/1968 | Berner et al. ................ | 165/122 |
| 3,362,586 A | 1/1968 | Dedoes | |
| 3,529,556 A | 9/1970 | Barnes | |
| 3,647,323 A | 3/1972 | Thomas | |
| 3,697,198 A * | 10/1972 | Holder, Jr. ..................... | 417/411 |
| 3,809,504 A * | 5/1974 | Goossens ...................... | 417/411 |
| 4,190,034 A | 2/1980 | Wonisch | |
| 4,516,561 A * | 5/1985 | Stawski et al. ............. | 126/25 B |
| D279,124 S | 6/1985 | Jensen et al. | |
| 4,734,017 A | 3/1988 | Levin | |
| 5,044,258 A * | 9/1991 | Wu et al. ........................ | 454/131 |
| D328,004 S | 7/1992 | Baltic et al. | |
| 5,181,836 A * | 1/1993 | Zeitlin .......................... | 417/313 |
| D372,773 S * | 8/1996 | Young .......................... | D23/386 |
| 6,571,788 B1 | 6/2003 | Goldstein | |
| 6,615,820 B1 | 9/2003 | Ferreira et al. | |
| 8,800,542 B1 * | 8/2014 | Kennington ................ | 126/25 B |
| 2008/0168977 A1 | 7/2008 | Daud | |
| 2014/0090634 A1 * | 4/2014 | Li et al. ...................... | 126/25 R |

\* cited by examiner

*Primary Examiner* — Jorge Pereiro

(57) ABSTRACT

A retrofittable grill fan assembly for PURPOSE includes a housing that has a first end wall, a second end wall and a perimeter wall attached to and extending between the first and second end walls. An air conduit is attached to the housing and is in fluid communication with an interior of the housing. The air conduit extends outwardly and downwardly from the housing. A coupler is mounted on the housing and is releasably engaged to an upper edge of a grill bowl. A fan is positioned within the housing and the housing at least one air inlet extending therethrough. The fan draws air into the housing through the at least one air inlet and expels air outwardly through the conduit when the fan is turned on. A power supply is electrically coupled to the fan and an actuator is electrically coupled to the fan to turn the fan on or off.

9 Claims, 4 Drawing Sheets

RETROFITTABLE GRILL FAN ASSEMBLY

BACKGROUND OF THE DISCLOSURE

Field of the Disclosure

The disclosure relates to grill fan devices and more particularly pertains to a new grill fan device for positioning on a grill to feed oxygen to the grill.

SUMMARY OF THE DISCLOSURE

An embodiment of the disclosure meets the needs presented above by generally comprising a housing that has a first end wall, a second end wall and a perimeter wall attached to and extending between the first and second end walls. An air conduit is attached to the housing and is in fluid communication with an interior of the housing. The air conduit extends outwardly and downwardly from the housing. A coupler is mounted on the housing and is configured to releasably engage an upper edge of a grill bowl. A fan is positioned within the housing and the housing at least one air inlet extending therethrough. The fan draws air into the housing through the at least one air inlet and expels air outwardly through the conduit when the fan is turned on. A power supply is electrically coupled to the fan and an actuator is electrically coupled to the fan to turn the fan on or off.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
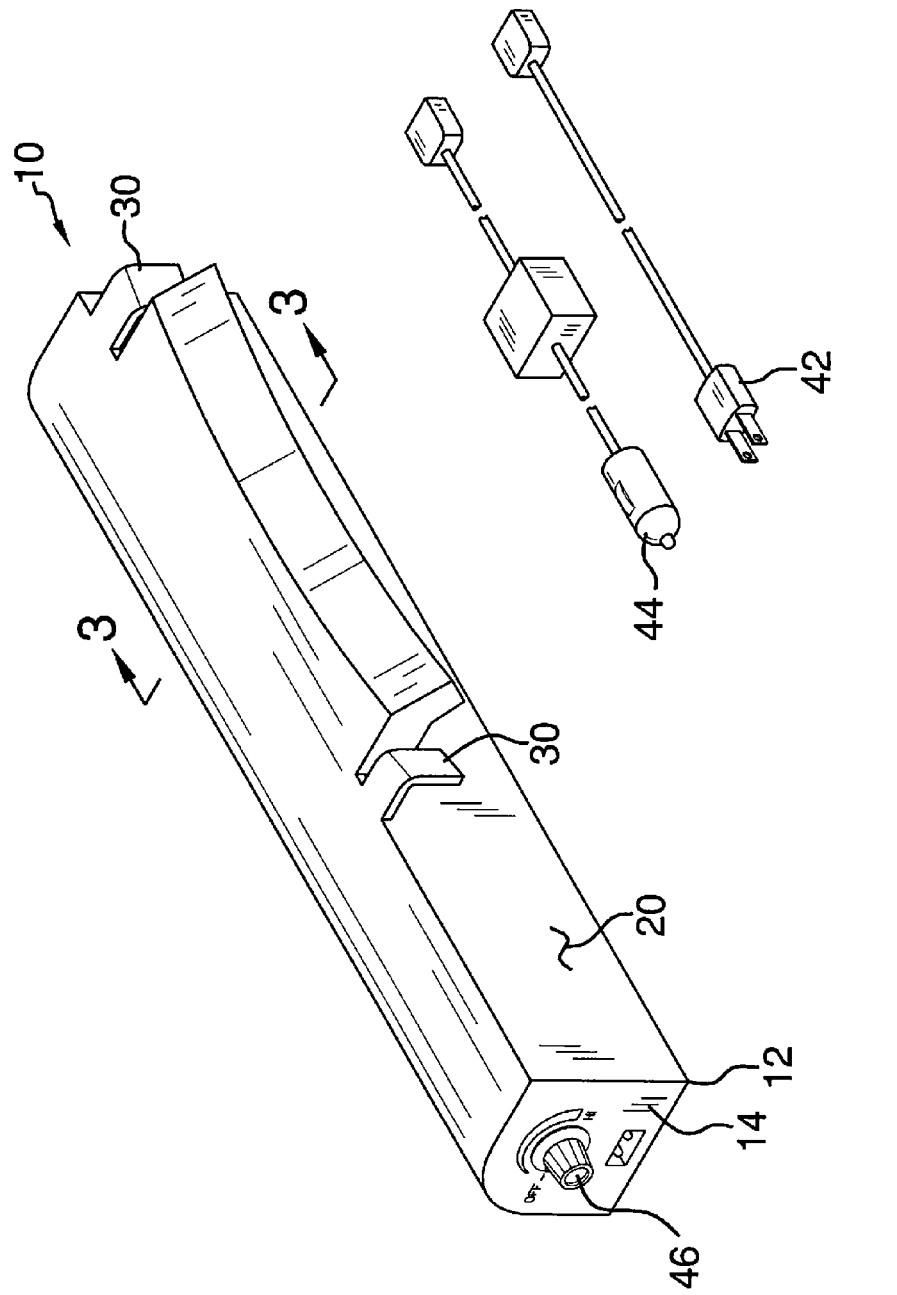
FIG. 1 is a top perspective view of a retrofittable grill fan assembly according to an embodiment of the disclosure.
Figure 3:
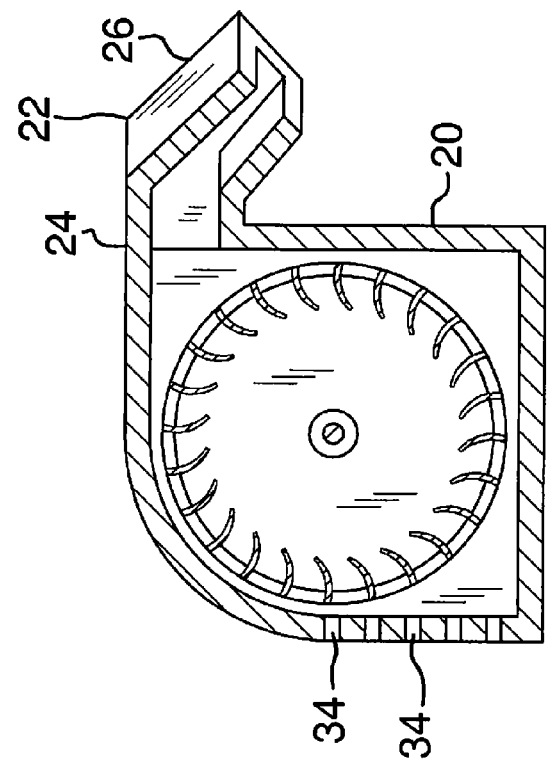
FIG. 3 is a cross-sectional view of an embodiment of the disclosure taken along line 3-3 of FIG. 1.
Figure 2:
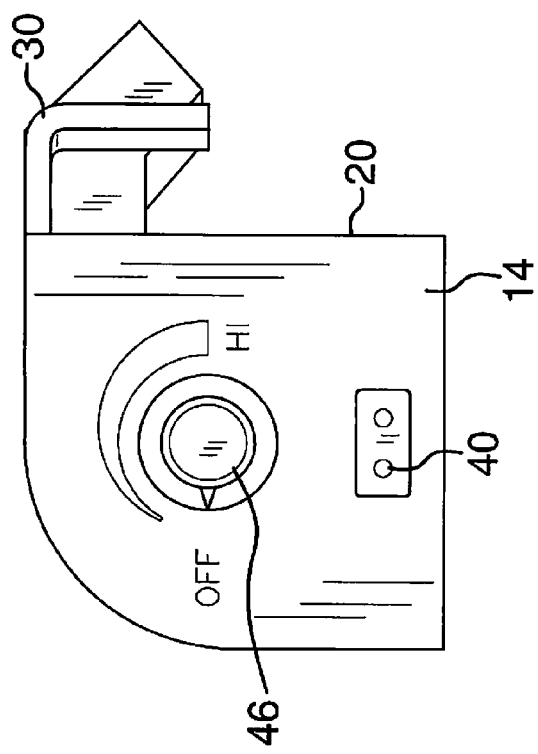
FIG. 2 is a side view of an embodiment of the disclosure.
Figure 4:
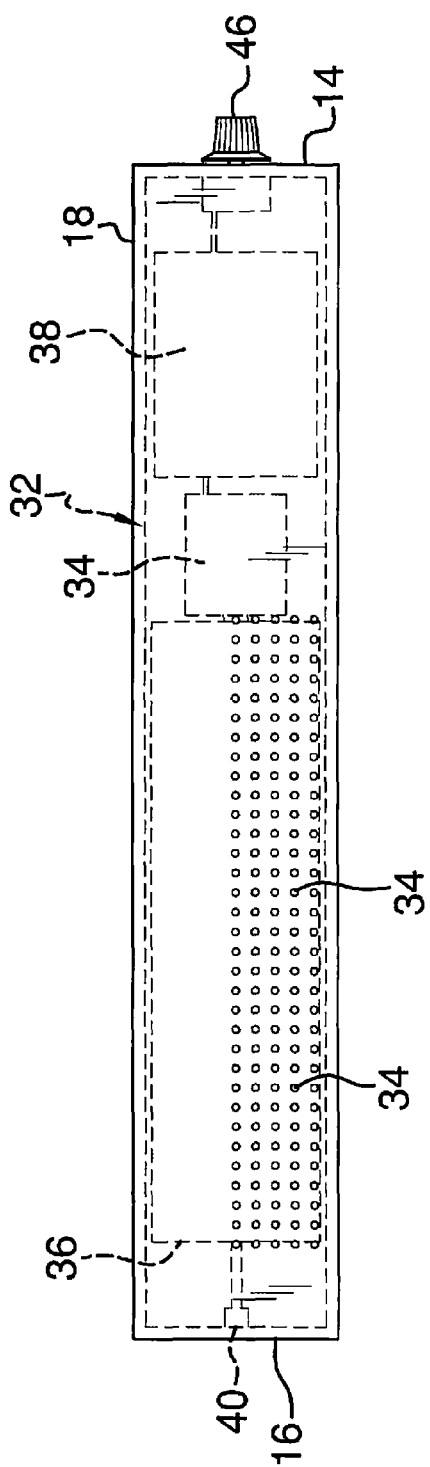
FIG. 4 is a rear view of an embodiment of the disclosure.
Figure 5:
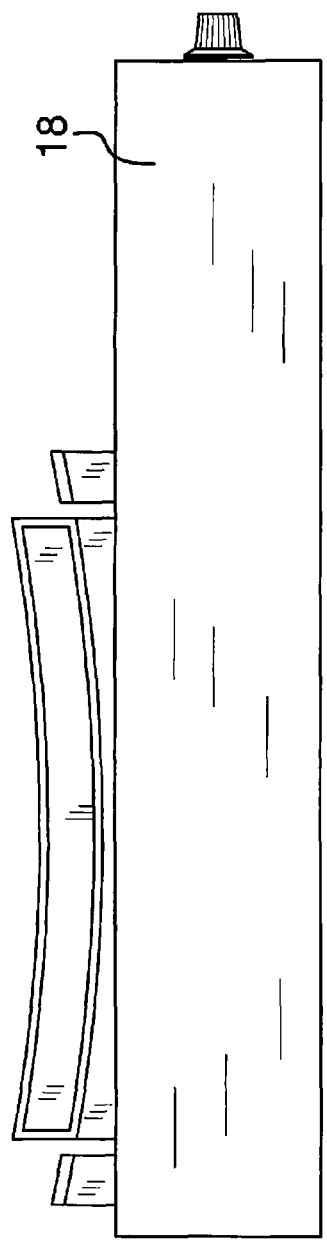
FIG. 5 is a bottom view of an embodiment of the disclosure.
Figure 6:
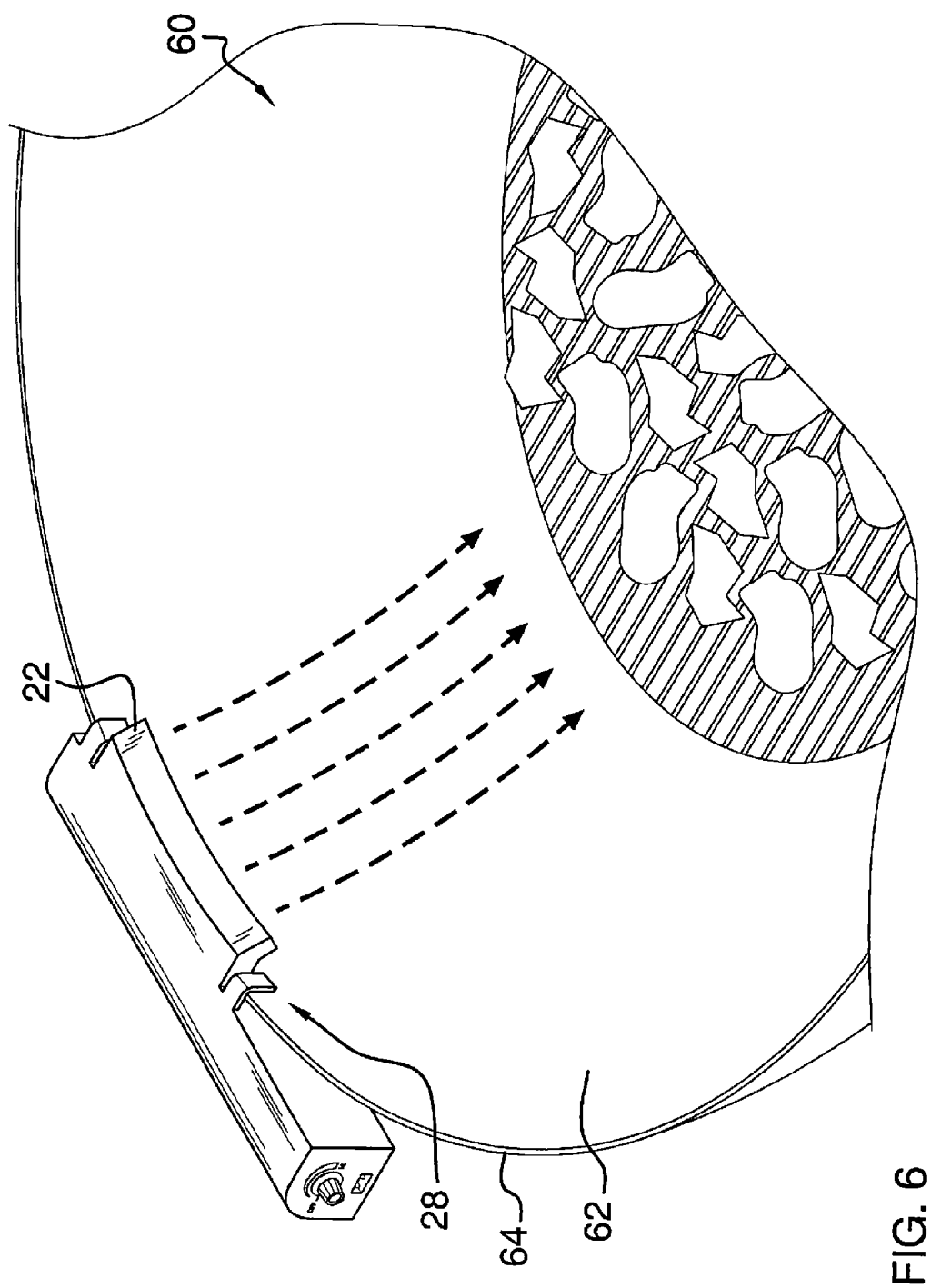
FIG. 6 is a perspective in-use view of an embodiment of the disclosure.

With reference now to the drawings, and in particular to FIGS. 1 through 6 thereof, a new grill fan device embodying the principles and concepts of an embodiment of the disclosure and generally designated by the reference numeral 10 will be described.

As best illustrated in FIGS. 1 through 6, the retrofittable grill fan assembly 10 generally comprises a housing 12 having a first end wall 14, a second end wall 16 and a perimeter wall 18 attached to and extending between the first 14 and second 16 end walls. The perimeter wall 18 includes a front wall 20. The housing 12 may have a length from the first end wall 14 to the second end wall 16 less than at least 50.0 cm and more particularly less than 35.0 cm.

An air conduit 22 is attached to the front wall 20 of the housing 12 and is in fluid communication with an interior of the housing 12. The air conduit 22 extends outwardly and downwardly from the housing 12. More particularly, the air conduit 22 including a first section 24 attached to the housing 12 and a second section 26 is distal to the housing 12. The first section 24 extends horizontally away from the housing 12 a distance equal to at least 2.0 cm. The second section 26 is angled downwardly from a horizontal plane between 20° and 90°. The second section 26 may be arcuate to match the contour of a grill 60.

A coupler 28 is mounted on the housing 12. The coupler 28 is configured to releasably engage an upper edge 64 of a grill bowl 62. The coupler 28 includes a pair of catches 30 attached to the front wall 20 and placed such that the air conduit is positioned between the catches 30. The catches 30 may include L-shaped clips.

A fan 32 is positioned within the housing 12. The housing 12 has at least one air inlet 34 extending therethrough. The fan 32 draws air into the housing 12 through the at least one air inlet 34 and expels air outwardly through the conduit 22 when the fan 32 is turned on. The fan 32 more particularly includes a motor 34 and a propeller 36 or impeller. A cage fan is shown in the Figures though any conventional fan apparatus may be utilized. A power supply 38 is electrically coupled to the fan 32. The power supply 38 may comprise a rechargeable battery. A charging port 40 is mounted on the housing 12 and is electrically coupled to the battery to facilitate recharging of the battery. The charging port 40 may be used for electrically coupling the power supply 38 with a conventional power source such as with a male wall outlet plug 42 or may be powered, for instance, with a vehicle electric source with a male power port plug 44. An actuator 46 is electrically coupled to the fan 32 to turn the fan 32 on or off and may further be used for selecting a fan speed.

In use, the housing 12 is placed on the bowl 62 of the grill 60. The bowl 62 is generically defined as the vessel used to hold coals or other fuel used for cooking. The fan 32 is turned on, as needed, to blow air into the bowl 62 to feed additional oxygen to the coals.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A fan assembly configured for mounting on a grill, said fan assembly including:

a housing having a first end wall, a second end wall and a perimeter wall being attached to and extending between said first and second end walls, said perimeter wall including a front wall;

a coupler being mounted on said housing, said coupler being configured to releasably engage an upper edge of a grill bowl;

an air conduit being attached to said housing and being in fluid communication with an interior of said housing, said air conduit extending outwardly and downwardly from said housing, said air conduit having a first section extending outwardly relative to said housing such that said first section is configured for extending over the upper edge of the grill bowl, said air conduit having a second section extending from said first section, said second section being directed outwardly and downwardly such that an open end of said second section is configured for positioning over a grill grate positioned in the grill bowl, said second section being arcuate such that said second section is configured for extending around the grill bowl;

a fan being positioned within said housing, said housing having at least one air inlet extending therethrough, said fan drawing air into said housing through said at least one air inlet and expelling air outwardly through said conduit when said fan is turned on wherein said second section is configured for directing the air downwardly into the grill bowl;

a power supply being electrically coupled to said fan; and an actuator being electrically coupled to said fan to turn said fan on or off.

2. The fan assembly according to claim 1, wherein said housing has a length from said first end wall to said second end wall less than 35.0 cm.

3. The fan assembly according to claim 1, wherein said coupler including a pair of catches attached to said front wall, said air conduit being positioned between said catches.

4. The fan assembly according to claim 1, wherein said power supply comprises a rechargeable battery.

5. A fan assembly configured for mounting on a grill, said fan assembly including:

a housing having a first end wall, a second end wall and a perimeter wall being attached to and extending between said first and second end walls, said perimeter wall including a front wall, said housing having a length from said first end wall to said second end wall less than 35.0 cm;

a coupler being mounted on said housing, said coupler being configured to releasably engage an upper edge of a grill bowl, said coupler including a pair of catches attached to said front wall;

an air conduit being attached to said front wall of said housing and being in fluid communication with an interior of said housing, said air conduit extending outwardly and downwardly from said housing, said air conduit including a first section attached to said housing and a second section being distal to said housing, said first section extending horizontally away from said housing a distance equal to at least 2.0 cm said air conduit being positioned between said catches, said first section extending outwardly relative to said housing such that said first section is configured for extending over the upper edge of the grill bowl, said second section extending from said first section, said second section being directed outwardly and downwardly such that an open end of said second section is configured for positioning over a grill grate positioned in the grill bowl, said second section being arcuate such that said second section is configured for extending around the grill bowl;

a fan being positioned within said housing, said housing having at least one air inlet extending therethrough, said fan drawing air into said housing through said at least one air inlet and expelling air outwardly through said conduit when said fan is turned on wherein said second section is configured for directing the air downwardly into the grill bowl;

a power supply being electrically coupled to said fan, said power supply comprising a rechargeable battery; and an actuator being electrically coupled to said fan to turn said fan on or off and for selecting a fan speed.

6. A system for blowing air onto coals, said system including:

a grill including a grill bowl having an upper edge;

a housing having a first end wall, a second end wall and a perimeter wall being attached to and extending between said first and second end walls, said perimeter wall including a front wall;

a coupler being mounted on said housing, said coupler releasably engaging said upper edge of said grill bowl;

an air conduit being attached to said housing and being in fluid communication with an interior of said housing, said air conduit extending outwardly and downwardly from said housing, said air conduit having a first section extending outwardly relative to said housing such that said first section is configured for extending over said upper edge of said grill bowl, said air conduit having a second section extending from said first section, said second section being directed outwardly and downwardly such that an open end of said second section is positioned over a grill grate positioned in said grill bowl, said second section being arcuate such that said second section extends around said grill bowl;

a fan being positioned within said housing, said housing having at least one air inlet extending therethrough, said fan drawing air into said housing through said at least one air inlet and expelling air outwardly through said conduit when said fan is turned on wherein said second section is directs the air downwardly into said grill bowl;

a power supply being electrically coupled to said fan; and an actuator being electrically coupled to said fan to turn said fan on or off.

7. The fan assembly according to claim 6, wherein said housing has a length from said first end wall to said second end wall less than 35.0 cm.

8. The fan assembly according to claim 6, wherein said coupler including a pair of catches attached to said front wall, said air conduit being positioned between said catches.

9. The fan assembly according to claim 6, wherein said power supply comprises a rechargeable battery.

* * * * *